United States Patent [19]

Azarian

[11] Patent Number: 5,013,521
[45] Date of Patent: May 7, 1991

[54] INTERNAL SHELL OF A FAST-NEUTRON NUCLEAR REACTOR COMPRISING A THERMAL PROTECTION DEVICE

[75] Inventor: Garo Azarian, Nay-Aux-Roses, France

[73] Assignee: Novatome, Courbevoie, France

[21] Appl. No.: 362,996

[22] Filed: Jun. 8, 1989

[30] Foreign Application Priority Data

Jun. 9, 1988 [FR] France ............................ 88 07722

[51] Int. Cl.⁵ .................... G21C 11/08; G21C 15/12
[52] U.S. Cl. .................................................. 376/290
[58] Field of Search .............................. 376/290, 291

[56] References Cited

U.S. PATENT DOCUMENTS

| | | | |
|---|---|---|---|
| 4,167,445 | 9/1979 | Aubert et al. | 376/290 |
| 4,249,995 | 2/1981 | Jogand | 376/290 |
| 4,298,431 | 11/1981 | Depierre et al. | 376/290 |

FOREIGN PATENT DOCUMENTS 0020264 12/1980 European Pat. Off. .
0265311 4/1988 European Pat. Off. .
2532629 12/1985 France .
1431371 4/1976 United Kingdom .
2000355 1/1979 United Kingdom .

*Primary Examiner*—Daniel D. Wasil
*Attorney, Agent, or Firm*—Pollock, Vande Sande & Priddy

[57] ABSTRACT

The internal shell (6) of the nuclear reactor comprises at least one cylindrical sleeve (10) with a vertical axis. An annular enclosure (20) is arranged on the internal periphery of the cylindrical sleeve (10), at the top part thereof. The enclosure (20) is open upwards and delimited by a cylindrical secondary sleeve (21) arranged coaxially and inside the cylindrical sleeve (10) of the internal shell. The top end of the secondary sleeve (21) is located below the high level (14a) of the liquid metal inside the internal shell (6). An annular base (22) is fixed to the bottom end of the secondary sleeve (21) and onto the internal surface of the cylindrical sleeve (10) of the internal shell (6), below the low level (14b) of the liquid metal.

5 Claims, 4 Drawing Sheets

INTERNAL SHELL OF A FAST-NEUTRON NUCLEAR REACTOR COMPRISING A THERMAL PROTECTION DEVICE

FIELD OF THE INVENTION

The invention relates to an internal shell of a fast-neutron nuclear reactor, with an improved structure.

BACKGROUND OF THE INVENTION

Fast-neutron nuclear reactors cooled by liquid metal generally comprise a main vessel of large dimensions enclosing the liquid cooling metal, most often sodium, in which the reactor core is immersed. Inside the main vessel there are arranged internal structures supporting the core and enabling the sodium circulating inside the vessel to be channelled and the internal volume of the vessel to be separated into different parts where the liquid sodium is at different temperatures.

One part of these structures, which comprises an ogival toric shoulder surmounted by a substantially cylindrical sleeve, forms an internal shell separating the internal volume of the main vessel above the core support into a hot collector situated inside the internal shell and a cold collector situated outside the internal shell.

The components of the reactor, such as the pumps for circulating the liquid sodium and the intermediate heat exchangers in the case of an integrated type nuclear reactor, are immersed in the liquid sodium filling the main vessel and pass with their bottom part through the internal shell in the region of the shoulder.

The top part of main vessel is closed by a plate which also supports the vessel and the components. The liquid metal in the main vessel has an upper free level above which there is an inert gas such as argon, inside a space situated underneath the closure plate.

This upper free level of the liquid sodium is essentially variable during operation of the reactor; it is in fact capable of moving between two well-defined positions inside the internal shell which will be referred to below as the high level and low level.

The level is, on the other hand, constant inside the main vessel of the reactor owing to the presence of a run-off assembly.

The top end of the internal shell is located above the high level of the sodium, such that this shell permanently ensures separation of the internal volume of the main vessel into two zones.

The top part of this shell is therefore subjected to a high axial temperature gradient due to the presence of the liquid sodium/inert gas interface, both during permanent-state operation of the reactor and during transient operational states which are accompanied by variations in the free level of the liquid sodium.

This axial temperature gradient is accompanied by thermomechanical stresses in the top part of the internal shell, such that it is necessary to monitor the operating performance of this shell and avoid operational states accompanied by excessively rapid displacements of the free level. In particular, when the reactor is started up, it is necessary to limit the rise in temperature of the sodium, and this increases the duration of these start-up operations.

The inert gas located above the liquid sodium is in fact at a temperature which constantly remains well below the temperature of the liquid sodium. The emersed part of the internal shell is therefore much colder than the immersed part.

Furthermore, in order to limit the effect of any stresses of seismic origin on the internal shell, it is necessary to fix on the top part of this shell a reinforcing structure which generally consists of an annular part welded to the top end of the shell. The presence of this reinforcement accentuates the thermal inertia phenomena and increases the axial temperature gradient during transient states.

FR-A-2,532,629 and GB-A-1,431,371 describe devices for reducing the thermal stresses in the wall of a vessel such as the external vessel of a nuclear reactor cooled by liquid sodium, consisting of an annular enclosure which is supplied with hot liquid metal either via its bottom part or via its top part, by annexed means. In this way, the part of the wall of the vessel in contact with the hot liquid metal introduced into the enclosure is kept at a fixed temperature whatever the variations in the level of the liquid metal inside the vessel.

Such a device, which requires annexed means for supplying the annular enclosure with hot liquid metal, cannot be applied to the case of the internal shell of a fast-neutron nuclear reactor and is not capable of limiting the thermal stresses in the wall, during all stages of use of the reactor vessel. In fact, protection is not ensured when the reactor is shut down.

SUMMARY OF THE INVENTION

The object of the invention therefore, is to propose an internal shell contained in the main vessel of a fast-neutron nuclear reactor enclosing liquid metal for cooling the reactor, the upper free level of which is capable of moving inside this internal shell, during normal operation of the reactor, between two defined positions respectively referred to as "high level" on the one hand and low level. The internal shell inside the main vessel comprises at least one cylindrical sleeve with a vertical axis, the top part of which is located above the high level of the liquid metal inside the main vessel, and an annular enclosure on the internal periphery of the cylindrical sleeve, open upwards at its top part and delimited by a secondary sleeve arranged substantially coaxially and inside the cylindrical sleeve, and by an annular base fixed to the bottom end of the secondary sleeve and onto the internal surface of the cylindrical sleeve, below the low level of the liquid metal, this internal shell having a structure enabling the thermomechanical stresses to be limited considerably as a result of the annular enclosure, without using annexed means for supplying liquid metal, and in all situations in which the reactor is used.

For this purpose, the top end of the secondary sleeve is located below the high level of the liquid metal.

According to a preferred embodiment, the annular base of the enclosure is made solid so as to form a reinforcement for the cylindrical sleeve of the internal shell, enabling it to withstand the stresses accompanying a tremor.

BRIEF DESCRIPTION OF THE DRAWINGS

In order that the invention may be properly understood, a description now follows, by way of example, with reference to the appended drawings, of an embodiment of an improved internal shell according to the invention.

DESCRIPTION OF THE PREFERRED EMBODIMENT

Figure 1:
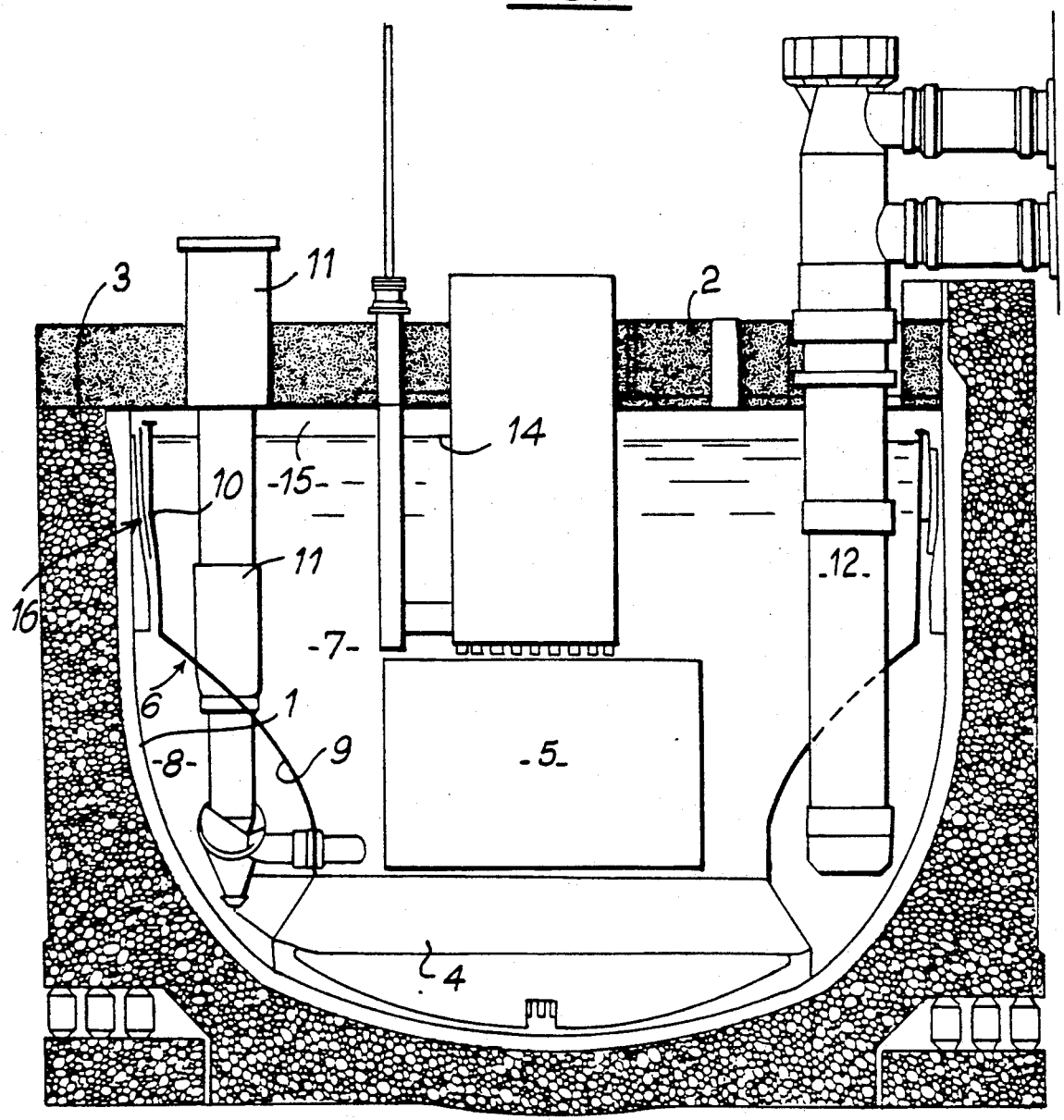
FIG. 1 is a general sectional view through a vertical plane of the main vessel of a fast-neutron nuclear reactor and of its internal structures.

FIG. 1 shows the main vessel 1 of a fast-neutron nuclear reactor cooled by liquid sodium, suspended from a concrete closure plate 2 itself supported by a structure 3, also made of concrete.

The support 4 of the reactor core 5 consisting of fuel assemblies rests on the bottom of the vessel 1.

Inside the vessel 1, and in an arrangement substantially coaxial relative to this vessel, there is arranged an internal shell 6 separating the internal volume of the vessel 1 into a hot collector 7 and a cold collector 8.

The internal shell 6 has an ogival toric shoulder 9 surmounted by a substantially cylindrical sleeve 10.

The bottom part of the shoulder 9 rests on the core support 4, and the core assembly 5 is immersed inside the hot collector 7.

The components of the reactor, such as the pumps 11 and the heat exchangers 12, pass through the ogival shoulder 9 with their bottom part, and their top parts are therefore immersed in the hot collector and their bottom parts in the cold collector.

The liquid sodium filling the vessel has a free upper level 14 inside the internal shell 6, this free upper level having above it an inert gas atmosphere 15 underneath the plate 2 closing the vessel.

Outside the internal shell 6 there is arranged a run-off 16 enabling the cold sodium from the bottom part of the core to be channelled so as to ensure cooling of the main vessel.

Figure 2:
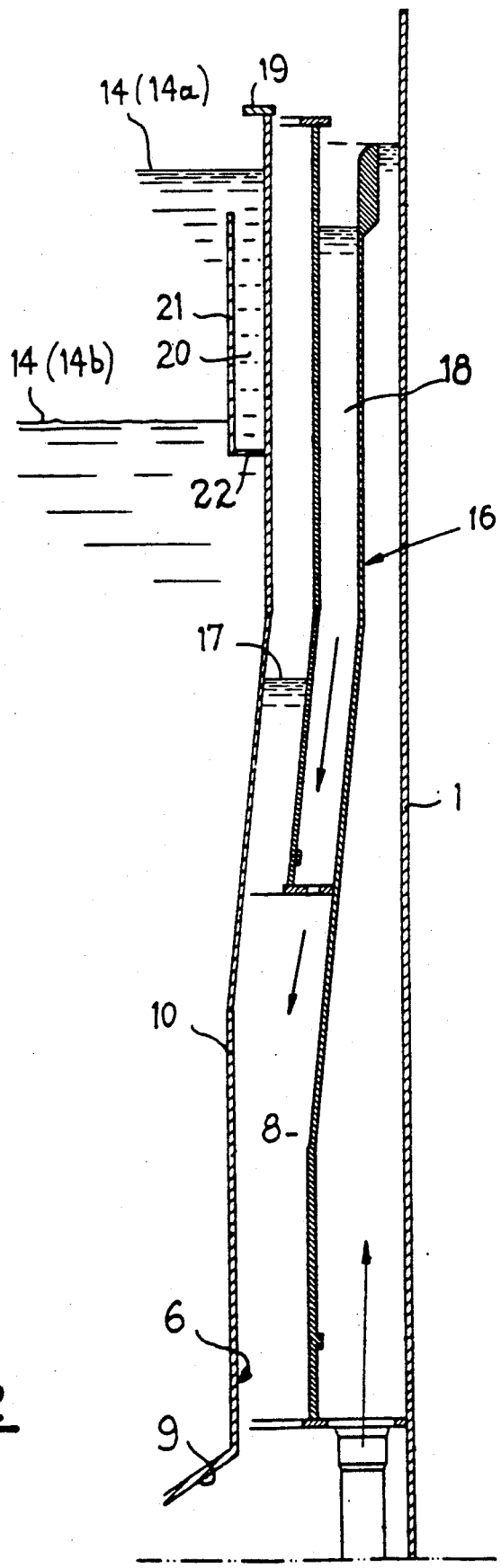
FIG. 2 is a sectional view, on a larger scale, through the top peripheral part of the internal shell of a nuclear reactor according to the invention.

This run-off 16, consisting mainly of coaxial sleeves with a vertical axis, is shown on a larger scale in FIG. 2. This device for channelling the sodium enables cold sodium to be circulated in contact with the internal surface of the main vessel 1, and the sodium then to be run off into an annular collector 18 communicating at its bottom with the cold collector 8 delimited by the internal surface of the main vessel 1 and the external surface of the internal shell 6. The liquid sodium is at a level 17 inside the cold collector, this level being situated below the free upper level 14 of the hot sodium inside the sleeve 10. The run-off system shown in FIG. 2, which allows any vibration of the main vessel 1 and its internal structures to be avoided, was the subject of U.S. Pat. No. 4,927,597.

During operation of the reactor, the free upper level 14 inside the internal shell 6 moves between two defined positions, respectively corresponding to the high level 14a and the low level 14b of the hot sodium inside the vessel.

The low level 14b corresponds to the level of the sodium during a reactor shut-down, the sodium being kept at a temperature close to 180° C.

The high level 14a corresponds to the highest position which the upper level 14 of the sodium may reach during normal operation of the reactor, i.e., in the nominal condition, the liquid sodium being at a temperature close to 600° C.

The top part 19 of the cylindrical sleeve 10 of the internal shell consisting of an annular-shaped reinforcement is located above the high level 14a of the sodium. The cylindrical sleeve 10 thus ensures, during all the stages of operation of the reactor, separation between the hot sodium and the cold sodium.

An annular enclosure 20 is arranged at the top of the sleeve 10 and on its internal periphery.

The enclosure 20 is delimited by a second sleeve 21, the diameter of which is less than the diameter of the sleeve 10 and which is arranged substantially coaxial width the top part of the sleeve 10.

The top part of the annular enclosure 20 is open and its bottom part is closed by an annular-shaped base 22 which is welded both to the bottom part of the second sleeve 21 and onto the internal surface of the sleeve 10. The base 22 ensures a sealed closure of the bottom part of the annular enclosure 20 and assembly of the second sleeve 21 with the cylindrical sleeve 10

As can be seen in FIG. 2, the top end of the second sleeve 21 is arranged below the high level 14a of the sodium, while the bottom base 22 is arranged below the low level 14b.

The second sleeve 21 preferably consists of a stainless steel sheet of the same quality and with the same thickness as the sheet forming the cylindrical sleeve 10. The thickness of this sheet is substantially equal to 1.5 cm.

With reference to a cylindrical sleeve 10' according to the prior art without an annular enclosure delimited by a second sleeve, similar to the enclosure 20 shown in FIG. 2.

Figure 3A:
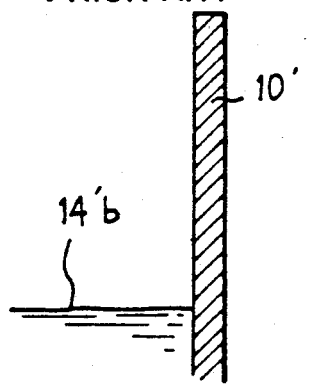
FIGS. 3a and 3b are schematic views of the top part of the cylindrical sleeve of the internal shell of a nuclear reactor according to the prior art, during two different stages of operation of the reactor.

FIG. 3a shows the cylindrical sleeve 10' in the case where the hot sodium inside the internal shell is at the low level 14'b, this level corresponding to a reactor shut-down, for example for the purpose of refuelling, the sodium being at a temperature close to 180°.

Figure 3B:
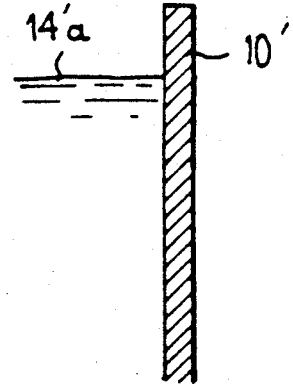

FIG. 3b shows the cylindrical sleeve 10' in contact with the hot sodium filling the internal shell up to the level 14'a. This level 14'a corresponds to the nominal operating condition of the reactor, the sodium being at a temperature of the order of 550° C.

Figure 4:
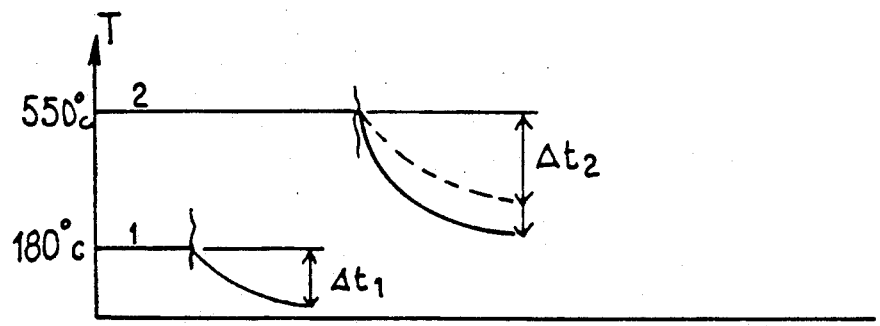
FIG. 4 is a graph showing variations in the temperature of the top part of the internal shell shown in FIGS. 3a and 3b, as a function of the level and during two different stages of operation of the reactor.

FIG. 4 shows the variation in temperature of the cylindrical sleeve 10', in the axial direction, i.e., along the height of this sleeve 10' and where the level is rising.

The zone of the sleeve 10' in contact with the liquid sodium, i.e. up to the level 14'b or 14'a is at a temperature substantially equal to the temperature of the liquid sodium, i.e., 180° C. in the case of FIG. 3a and 550° C. in the case of FIG. 3b.

From the free level, the temperature of the cylindrical sleeve 10' decreases very rapidly so as to reach, at the end thereof, a value less, by Δ t1 in the case of FIG. 3a and Δ t2 in the case of FIG. 3b, than the temperature of the liquid sodium.

It will be noted (solid- and broken-line curves in FIG. 4) that the value Δ t2 and the trend of the curve showing the drop in temperature above the sodium level are different in the case where the reactor is in permanent operation (broken-line curve) and in the case where the reactor is in a transient operating condition (solid-line curve).

In all cases, the axial temperature gradient is high, resulting in the appearance of high thermomechanical stresses in the cylindrical sleeve 10'.

FIGS. 5a to 5e show the cylindrical sleeve 10 according to the invention comprising an annular enclosure 20 on its internal periphery and on its top part. FIGS. 5a to 5e show different stages of operation of the reactor.

Figure 5A:
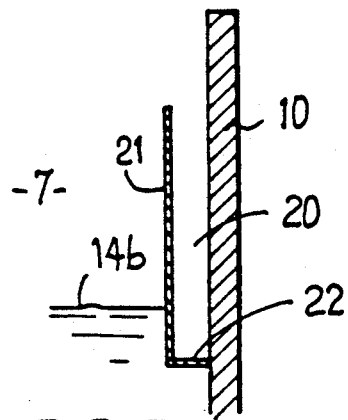
FIGS. 5a, 5b, 5c, 5d and 5e are schematic views of the top part of the internal shell according to the invention, during different stages of operation of the nuclear reactor.
Figure 5B:
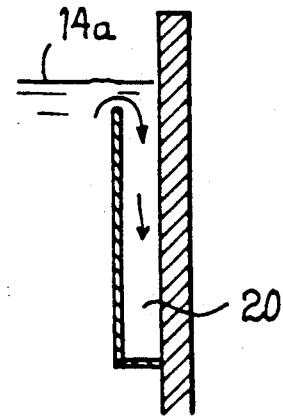

FIGS. 5a and 5b show the top part of the cylindrical sleeve 10 and the annular enclosure 20, in the case where the reactor is brought into service. In FIG. 5a, the level of the liquid sodium 14b inside the hot collector of the reactor corresponds to the level during the core loading stage, the sodium being at a temperature close to 180° C. The annular enclosure 20 has no sodium inside it.

When the reactor is brought into service and the temperature of the liquid sodium rises, the liquid sodium reaches an upper level inside the hot collector, which is shown in FIG. 5b. This upper level, which corresponds to the high level 14a, the sodium being at its operating temperature close to 550° C., is located above the top end of the secondary sleeve 21 delimiting the annular enclosure 20. The liquid sodium then runs off into the enclosure 20 until the latter is completely filled.

Figure 5C:
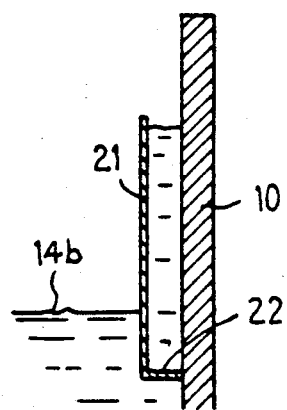
Figure 5D:
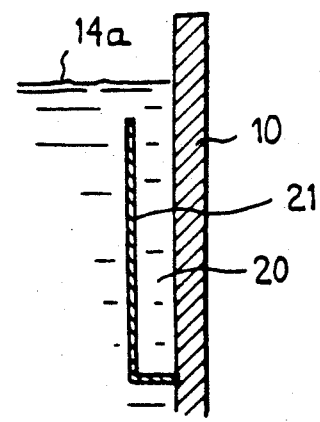

FIGS. 5c and 5d show the top part of the cylindrical sleeve 10 and the enclosure 20 during permanent operation of the reactor.

In FIG. 5c, the reactor is at the end of a shut-down period, for example for the purposes of refuelling, the sodium being at a temperature close to 180° C. inside the hot collector and its upper level 14b corresponding to the low level.

This level 14b is situated above the bottom base 22 of the enclosure 20, such that the bottom part of this enclosure is in thermal contact with the sodium at 180°. The sodium introduced into the enclosure 20 when the reactor is brought into operation is kept at a temperature which is slightly lower than 180° C. and relatively constant over the entire height of the enclosure 20, as a result of thermal contact with the sodium of the hot collector and owing to convection. Thermal protection of the sleeve 10 is thus also ensured during periods where the reactor is shut down.

During restoration of normal operation of the reactor after a shut-down, the sodium heats up to a temperature of the order of 550° C. and its upper free level reaches the high level 14a, as shown in FIG. 5d.

The level 14a is above the top edge of the secondary sleeve 21 delimiting the annular space 20, such that this annular space 20 is placed in communication with the sodium of the hot collector. The liquid sodium contained inside the annular enclosure 20 is brought to a temperature of the order of 550° C., like the liquid sodium inside the hot collector.

Figure 5E:
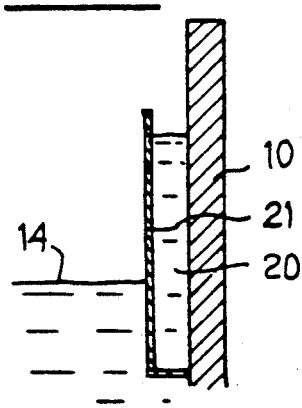

FIG. 5e shows the top part of the cylindrical sleeve 10 of the internal vessel and the enclosure 20, in the case where the reactor is in a transient operating condition, the upper level 14 inside the hot collector moving between a position corresponding to the low level and a position corresponding to the high level.

The upper level of the sodium inside the enclosure 20 moves correlatively between a low position and a high position which corresponds to the top end of the secondary sleeve 21 of the enclosure 20. The degree of displacement of the upper level inside the enclosure 20 is not, however, very significant, the displacement of the sodium level being due simply to the expansion caused by the variations in temperature of the sodium contained inside this enclosure. The temperature of the sodium inside the enclosure is substantially constant, owing to the convection effects.

The result in all cases is that the temperature gradient in the axial direction of the cylindrical sleeve 10 is relatively low and considerably reduced compared to the case of an internal shell according to the prior art, as shown in FIGS. 3a and 3b.

Figure 6:
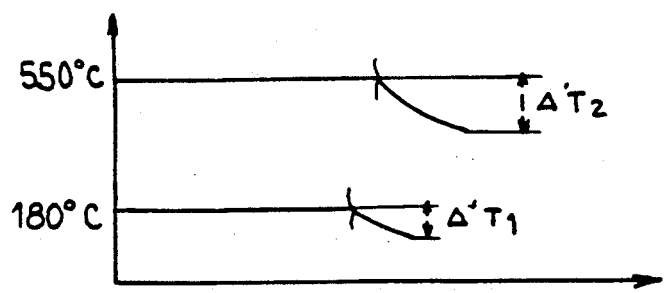
FIG. 6 is a graph showing the variations in temperature of the top part of the internal shell shown in FIGS. 5a to 5e, in the axial direction and during different stages of operation of the reactor.

FIG. 6 shows the temperature variations in the axial direction of the cylindrical sleeve 10, as shown in FIGS. 5c, 5d and 5e.

The lower curve shows the variations in the temperature in the axial direction of the cylindrical sleeve 10, in the case where the sodium at 180° C. is at its low level 14b. In this case, the temperature of the cylindrical sleeve 10 is substantially the same as the temperature of the sodium inside the hot collector, namely 180° C., inside all the immersed part of the cylindrical sleeve 10. Above the free level 14b, the temperature drops slightly and by a total amount equal to Δ't1, up to the top end of the sleeve 10.

In the case of a permanent operating condition of the reactor as shown in FIG. 5d or a transient operating condition as shown in FIG. 5e, the temperature of the cylindrical sleeve 10, in its part immersed in the sodium of the hot collector, is substantially equal to 550° C., this temperature then dropping beyond the free level 14a (14), this drop by a total amount Δ't2 up to the top end of the sleeve 10 being small compared to the drop in temperature, in the case of the sleeve 10' shown in FIG. 3b.

By comparing FIGS. 6 and 4, it is possible to note that Δ't2, is very much less than Δ t2 and Δ't1 very much less than Δ t1.

This results in thermomechanical stresses which are much smaller in the top part of the internal shell according to the invention than in the top part of the internal sleeve according to the prior art.

Figure 7:
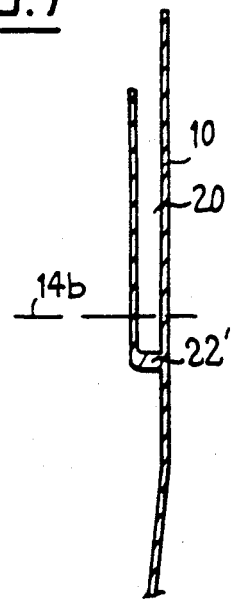
FIG. 7 is a sectional view through the top part of the internal shell according to the invention, of which the solid base of the annular enclosure forms a reinforcement for the shell.

FIG. 7 shows the top part of the cylindrical sleeve 10 of an internal shell according to the invention comprising an enclosure 20, the bottom part of which is delimited by an annular-shaped base of great thickness 22' forming a reinforcement for the top part of the cylindrical sleeve 10 and of the internal shell 6. This reinforcement 22' arranged below the low level 14b of the sodium is at a temperature which always corresponds substantially to the temperature of the hot sodium and of the immersed part of the cylindrical sleeve 10. The arrangement of the reinforcement below the sodium level enables the thermal inertia and the temperature gradient effect to be reduced, compared to the case of a reinforcement on the top, constantly immersed part of the cylindrical sleeve 10.

This results in the formation both of the base of the annular enclosure 20 limiting the temperature gradient in the cylindrical sleeve 10, and of the upper reinforcement of this sleeve preventing the occurrence of notable deformations or vibrations in the case of a tremor.

The invention thus enables the temperature gradient and therefore the thermomechanical stresses in the top part of the internal shell of a fast-neutron nuclear reactor to be limited under any conditions, whether the reactor is in operation or shut-down, as a result of an annular enclosure and without using annexed means for supplying the enclosure with liquid metal. This arrangement also allows the operational ranges of the nuclear reactor to be broadened, as regards the extent and rapidity of the transient conditions acceptable during operation and as regards the increase in temperature upon start-up of the reactor. These new possibilities are obtained without increasing the thermomechanical stresses in the top part of the internal shell.

In the case of a fast-neutron nuclear reactor of the current art, an annular enclosure 20 with a width at the most equal to 10 cm will preferably be provided, this width corresponding to the radial distance between the internal surface of the cylindrical sleeve 10 and the internal surface of the secondary sleeve 21 of the enclosure 20. The height of the secondary sleeve 21 will preferably be chosen so as to be less than 1.5 m. The top end of the second sleeve will be located preferably at a distance of the order of 10 cm below the high level 14a of the sodium inside the hot collector.

It is possible to use other dimensions and other embodiments of the annular enclosure 20 limiting the temperature gradient in the top part of the internal shell.

In the case where the internal shell comprises several concentric sleeves immersed in the liquid sodium and forming, for example, annular spaces for channelling the sodium, it is possible to associate, with all or some of these sleeves, annular enclosures keeping in contact with the top part of the sleeves a certain quantity of sodium limiting the temperature gradient in the top part of the corresponding sleeves.

The invention is not limited to nuclear reactors cooled by liquid sodium, but may be applied to any nuclear reactor cooled by a liquid metal.

I claim:

1. A fast neutron nuclear reactor which comprises a main vessel (1) enclosing liquid metal for cooling the reactor, an upper free level of said liquid metal being capable of moving inside an internal shell, during normal operation of the reactor, between two defined positions respectively referred to as high level (14a) and low level (14b), and, inside the main vessel (1), the internal shell (6) comprising at least one cylindrical sleeve (10) with a vertical axis, a top part of which is located above said high level (14a) of the liquid metal inside the main vessel, and an annular enclosure (20) on the internal periphery of the cylindrical sleeve (10) of the internal shell (6), open upwards at its top part and delimited by a secondary sleeve (21) arranged substantially coaxially and inside the cylindrical sleeve (10), and by an annular base (22) fixed to the bottom end of the cylindrical sleeve (21) and onto the internal surface of the cylindrical sleeve (10) of the internal shell, below the low level (14b) of the liquid metal, wherein the top end of the secondary sleeve (21) is located below the high level (14a) of the liquid metal.

2. Nuclear reactor according to claim 1, wherein the annular base (22), which is solid, forms a reinforcement for the cylindrical sleeve (10) of the internal shell (6) to limit the effects of seismic stresses.

3. Nuclear reactor according to claim 1, wherein the annular enclosure (20) has a width, in the radial direction of the cylindrical sleeve (10) of the internal shell (6), up to 20 cm, and a height, in the axial direction of the cylindrical sleeve (10), up to 1.5 m.

4. Nuclear reactor according to claim 3, wherein the top end of the secondary sleeve (21) of the annular enclosure (20) is arranged at a level situated substantially at 10 cm below the high level (14a) of the liquid metal.

5. Nuclear reactor according to claim 3, wherein the secondary sleeve (21) of the annular enclosure (20) is made from a sheet having a thickness of about 1.5 cm.

* * * * *